United States Patent [19]

Kress et al.

[11] Patent Number: 4,611,959
[45] Date of Patent: Sep. 16, 1986

[54] REAMER WITH RADIALLY ADJUSTABLE TOOL BIT POSITION

[75] Inventors: Dieter Kress, Aalen; Friedrich Häberle, Lauchheim, both of Fed. Rep. of Germany

[73] Assignee: MAPAL Fabrik für Präzisionswerkzeuge Dr. Kress KG, Aalen, Fed. Rep. of Germany

[21] Appl. No.: 736,102

[22] Filed: Jul. 3, 1985

Related U.S. Application Data

[63] Continuation of Ser. No. 458,903, Jan. 18, 1983, abandoned.

[30] Foreign Application Priority Data

Jan. 20, 1982 [DE] Fed. Rep. of Germany ....... 3201508

[51] Int. Cl.⁴ .............................................. B23D 77/02
[52] U.S. Cl. ..................................... 408/180; 408/153; 408/239 R; 408/713; 407/90; 407/107
[58] Field of Search ............... 408/153, 179, 180, 181, 408/197, 713, 239 R; 407/33, 44, 45, 47, 73, 77, 90, 102, 106, 107

[56] References Cited

U.S. PATENT DOCUMENTS 3,203,493 8/1965 Bergstrom ........................... 408/180
4,533,283 8/1985 Satran et al. ........................ 407/106

FOREIGN PATENT DOCUMENTS 2542804 4/1976 Fed. Rep. of Germany ...... 407/106
2705360 8/1978 Fed. Rep. of Germany ... 408/239 R
1435339 5/1976 United Kingdom ............... 408/181

*Primary Examiner*—Gil Weidenfeld
*Assistant Examiner*—Daniel W. Howell
*Attorney, Agent, or Firm*—Erwin S. Teltscher

[57] ABSTRACT

Adjustment of the radial position of the tool bit is accomplished by insertion of the bit in a recess of a clamping shoe which clamps the bit against a shoulder in the cutter head. The clamping shoe has an extension which is rotatably mounted in a recess in the cutter head. A single wedge-shaped adjustment member rotates the clamping shoe with the cutter blade thereby changing the radial distance between the cutting edge and the axis of rotation of the tool.

7 Claims, 3 Drawing Figures

4,611,959

REAMER WITH RADIALLY ADJUSTABLE TOOL BIT POSITION

This is a continuation of application Ser. No. 06/458,903, filed on Jan. 18, 1983, now abandoned.

Cross reference to related applications and publications:
1. U.S. Pat. No. 3,490,315;
2. U.S. Pat. No. 4,293,252;
3. U.S. Pat. No. 4,211,507;
4. U.S. Pat. No. 4,199,284;
5. U.S. Pat. No. 2,977,829;
6. German Pat. No. 16 27 221.

FIELD OF THE INVENTION

The present invention relates to cutting tools and, more particularly, to reamers with a single tool bit.

BACKGROUND OF THE INVENTION

Reamers in which the position of the tool bit can be adjusted in the radial direction are described, for example, in U.S. Pat. No. 2,977,829. There, a cutting disk in the shape of a quadrilateral is arranged in a recess in the cutter head and is pressed against the shoulder of the cutter head by means of a clamping shoe. Two movable adjustment members positioned in two bores of the cutter head are provided for radial adjustment of the position of the tool bit and for adjustment of the position of the auxiliary cutting edge which is tapered in the direction towards the shaft. The adjustment members engage in the recess of the cutter head and abut the surface opposite the auxiliary cutting edge then being used.

SUMMARY OF THE INVENTION

The present invention is an improvement in a reamer which has a shaft, a cutter head mounted on the shaft and a tool bit, the latter being clamped to the cutter head by means of a clamping shoe. The invention consists of a disk-shaped extension of the clamping shoe. The extension extends in the direction of the shaft of the reamer and forms at least part of a circle. The cutter head has a recess which receives the extension.

More specifically, the recess or bore of the cutter head which receives the extension of the clamping shoe is externally accessible, i.e., it extends to the outer surface of the cutter head.

Even more specifically, the clamping shoe has a recess into which the tool bit is inserted. Adjustment of the radial position of the tool bit is accomplished substantially free of any play by pivoting the clamping shoe about an axis of rotation within a limited angle by means of a single adjustment member, thereby changing the radial distance between the cutting edge and the axis of rotation of the tool. This of course changes the diameter of the hole being reamed.

To prevent this diameter from changing under the influence of the cutting force, the clamping shoe and its extension must be so mounted that neither the cutting force nor the movement of the adjustment member will cause it to move from its centered position within the recess in the cutter head. For this reason, the disk-shaped extension is at least semicircular.

If the tool bit is a disk having a circular cutting edge, radial movement of the disk does not change the degree of taper of the auxiliary cutting edge. Such a circular bit is shown in FIG. 1 of U.S. application Ser. No. 456,808 filed Jan. 10, 1983, now abandoned by the same inventors, assigned to the same assignee; priority: P32 01 137.7-14, Fed. Rep. of Germany. This U.S. application is hereby incorporated by reference into the present application.

The auxiliary cutting edge of such a circular tool bit is defined as the portion of the cutting edge following the point of the bit furthest from the axis of rotation of the reamer.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

Figure 1:
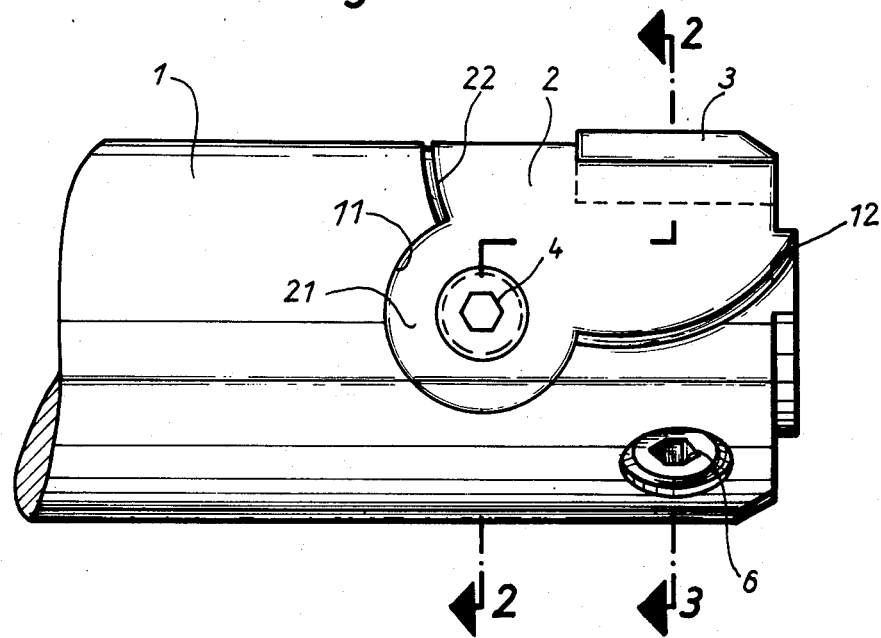
FIG. 1 is a side view of the cutter head.

Cutter head 1 has a recess which is bounded by circular surfaces 11 and 12. Clamping shoe 2 and its extension 21 are arranged in the recess. Specifically, clamping shoe 2 has circular outer surfaces 22 which have a smaller radius than the inner surface 12 of the recess in the cutter head. Extension 21 is at least semicircular, and abuts inner surface 11 of the recess in head; as can be seen from FIG. 1, it defines an arc of about 245°. 1. Tool bit 3 is received in a recess of clamping shoe 2. Extension 21 has a bore which receives a bolt 4 having two parts threaded in opposite sense to one another. Bolt 4 is used to press tool bit 3 against a shoulder of cutter head 1. The recess in clamping shoe 2 which receives tool bit 3 is somewhat narrower than the thickness of the tool bit.

Radial adjustment of tool bit 3 is effected by a wedge-shaped adjustment member 5. An adjusting screw 6 moves adjustment member 5 in a recess of cutter head 1.

The adjustment means, namely the adjustment member 5 and the adjusting screw 6, which are substantially free of any play, are thus able to pivot the clamping shoe 2 about an axis of rotation within a limited angle by applying an adjustment force to the clamping shoe 3 in a direction transverse to the axis of rotation of the clamping shoe 2.

Figure 2:
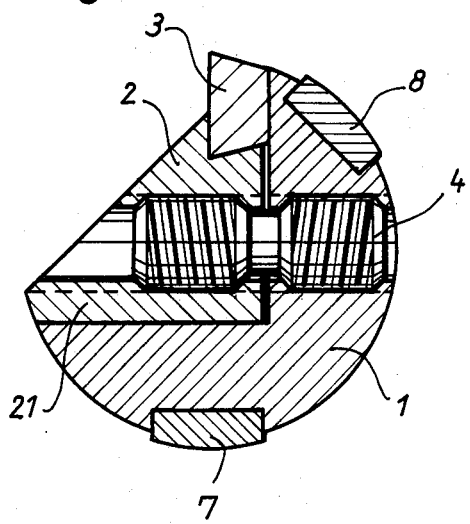
FIG. 2 is a radial cross-section along line 2—2 of FIG. 1.
Figure 3:
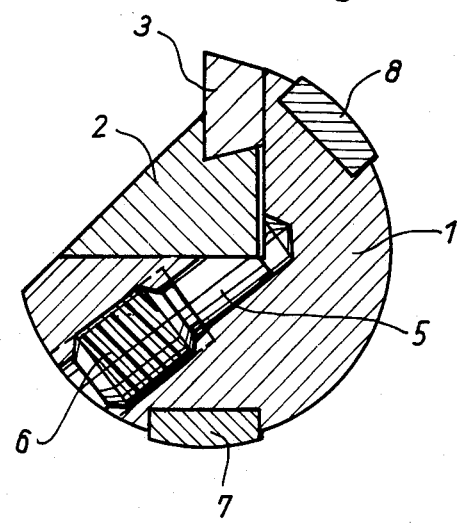
FIG. 3 is a radial cross-section along line 2—3 of FIG. 1.

Also shown in FIGS. 2 and 3 are guide members 7 and 8 which are arranged along the periphery of cutter head 1. These guide members allow automatic centering of a reamer having only a single tool bit. Their construction is not part of the present invention. No detailed description is required.

While the invention has been illustrated in a preferred embodiment, it is not to be limited to the specific members and structures shown, since many variations thereof will be evident to one skilled in the art and are intended to be encompassed in the present invention as set forth in the following claims.

We claim:
1. In a reamer having a shaft defining a longitudinal axis, a cutter head mounted on said shaft, and a tool bit;

a clamping shoe for clamping said tool bit to said cutter head, a first and a second peripheral region each shaped as arcs of a circle, and a disk-shaped extension extending in the direction of the longitudinal axis of said shaft between said arcs, said disc-shaped extension having a periphery defining an at least semi-circular arc;

attachment means for attaching said clamping shoe to said cutter head, adjusting means abutting said clamping shoe in an axial region of said cutter head for pivoting said clamping shoe about an axis of rotation within a limited angle, being substantially free of any play, and for applying an adjustment force to said clamping shoe in a direction transverse to said axis of rotation, whereby, due to said adjusting means being substantially free of said play, said limited angle is kept relatively small, resulting in a substantially exact guidance of said clamping shoe in said cutter head.

2. A reamer set forth in claim 1, further comprising a threaded bolt extending through said extension of said clamping shoe and constituting the axis of rotation thereof.

3. A reamer as set forth in claim 1, wherein said tool bit is circular.

4. A reamer as set forth in claim 1, wherein said shaft has an outermost surface, and a recess extending from said outermost surface for receiving said clamping shoe with said extension.

5. A reamer as set forth in claim 4,
wherein said arc of a circle constituting said first peripheral region has a radius of a predetermined length; and
wherein said recess of said shaft receiving said clamping shoe is a bore having a radius longer than said predetermined length.

6. A reamer as set forth in claim 1, wherein said disk-shaped extension has a periphery defining an arc of about 245°.

7. In a reamer having a shaft defining a longitudinal axis, said shaft having an outermost surface, a cutter head mounted on said shaft, and a tool bit;

a clamping shoe for clamping said tool bit to said cutter head, attachment means for attaching said clamping shoe to said cutter head, said clamping shoe being formed with first and second peripheral arcuate regions, each shaped as arcs of a circle, and having a disk-shaped extension extending towards the longitudinal axis of said shaft between said peripheral arcuate regions, said first arcuate region facing away from the longitudinal side of said tool bit, at least said first arcuate peripheral region having a radius of predetermined length, a recess extending from said outermost surface for receiving said clamping shoe with said extension, said recess of said shaft receiving said clamping shoe being a bore having a radius longer than the predetermined length of the radius of said first arcuate peripheral region, said disk-shaped extension having a periphery defining an at least semi-circular arc; and adjusting means abutting said clamping shoe in an axial region of said cutter head for pivoting said clamping shoe about an axis of rotation within a limited angle, being substantially free of any play, and for applying an adjustment force to said clamping shoe in a direction transverse to said axis of rotation, whereby, due to said adjusting means being substantially free of said play, said limited angle is kept relatively small, resulting in a substantially exact guidance of said clamping shoe in said cutter head.

* * * * *